(12) United States Patent
An et al.

(10) Patent No.: US 11,856,403 B2
(45) Date of Patent: Dec. 26, 2023

(54) INTELLIGENT NETWORK ACCESS TECHNOLOGY (NAT) SELECTION

(71) Applicant: T-Mobile USA, Inc., Bellevue, WA (US)

(72) Inventors: Kyeong Hun An, Sammamish, WA (US); Mathew George, Kirkland, WA (US); Nandita Sharma, Issaquah, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

(21) Appl. No.: 16/368,506

(22) Filed: Mar. 28, 2019

(65) Prior Publication Data

US 2020/0314637 A1  Oct. 1, 2020

(51) Int. Cl.
  *H04W 12/30* (2021.01)
  *H04W 12/63* (2021.01)
(52) U.S. Cl.
  CPC ........... *H04W 12/35* (2021.01); *H04W 12/63* (2021.01)
(58) Field of Classification Search
  CPC ..... H04W 88/06; H04W 8/183; H04W 48/18; H04W 12/06; H04W 60/00; H04W 60/005; H04W 84/042; H04W 8/06; H04W 12/0023; H04W 12/00405; H04W 36/08; H04W 36/14; H04W 76/10; H04W 88/02; H04W 36/18; H04W 48/10; H04W 48/12; H04W 48/20; H04W 4/02; H04W 64/00; H04W 68/00; H04W 68/005; H04W 72/1215; H04W 12/00403; H04W 36/24; H04W 36/36; H04W 60/04; H04W 72/02; H04W 72/10; H04W 72/1231; H04M 1/6066

See application file for complete search history.

(56) References Cited

U.S. PATENT DOCUMENTS

| 2007/0238458 | A1* | 10/2007 | Shim ..................... G01S 5/0054 455/433 |
| 2014/0373124 | A1* | 12/2014 | Rubin ............... H04W 28/0215 726/7 |
| 2017/0195947 | A1* | 7/2017 | Korneluk ............. H04W 48/18 |
| 2017/0346746 | A1* | 11/2017 | Zhang .................. H04W 48/18 |

FOREIGN PATENT DOCUMENTS

EP          3799517 A1 * 3/2021  ............ H04W 36/14

* cited by examiner

*Primary Examiner* — Srilakshmi K Kumar
*Assistant Examiner* — Jing Gao
(74) *Attorney, Agent, or Firm* — Lee & Hayes, P.C.

(57) ABSTRACT

Intelligent network access technology (NAT) control is described herein. An event associated with a mobile computing device can be detected. Responsive to the event being detected, a subscriber identity module (SIM) associated with the mobile computing device can access location information associated with a location of the mobile computing device. The SIM can access a configuration table storing NAT data provided by a network for controlling which NATs the mobile computing device is permitted to use to access the network. The SIM can determine, based at least in part on the NAT data and the location information, that a requested NAT of the mobile computing device is not a permissible NAT for the mobile computing device in the location and the SIM can cause the mobile computing device to connect to the network via an alternate NAT.

20 Claims, 6 Drawing Sheets

INTELLIGENT NETWORK ACCESS TECHNOLOGY (NAT) SELECTION

BACKGROUND

An access network is a network that connects subscribers (e.g., mobile computing devices associated therewith) to a service provider (e.g., a core network) and, through the core network, to other networks such as the Internet. Mobile computing devices can utilize various access technologies (e.g., network access technologies (NATs)) to establish a connection to the access network, core network, other network(s), and so forth. For example, mobile computing devices support one or more NATs including, BLUETOOTH®, WI-FI®, Global System for Mobile communications (GSM)/second-generation (2G), Universal Mobile Telecommunications System (UMTS)/third-generation (3G), Long-Term Evolution (LTE)/fourth-generation (4G), New Radio (NR)/fifth-generation (5G), etc.

DETAILED DESCRIPTION

Techniques described herein are directed to intelligent network access technology (NAT) control for controlling how mobile computing devices connect to NATs. In at least one example, an event associated with a mobile computing device can be detected. Responsive to the event being detected, a subscriber identity module (SIM) associated with the mobile computing device can access location information associated with a location of the mobile computing device. The SIM can access a configuration table storing NAT data provided by a network for controlling which NATs (e.g., Global System for Mobile communications (GSM)/second-generation (2G), Universal Mobile Telecommunications System (UMTS)/third-generation (3G), Long-Term Evolution (LTE)/fourth-generation (4G), New Radio (NR)/fifth-generation (5G), etc.) the mobile computing device is permitted to use to access the network. The SIM can determine, based at least in part on the NAT data and the location information, that a requested NAT of the mobile computing device is not a permissible NAT for the mobile computing device in the location and the SIM can cause the mobile computing device to connect to the network via an alternate NAT. That is, techniques described herein enable a SIM to control NAT selection of a mobile computing device using configurations that are represented in a configuration table.

With standard SIM function and configuration, a SIM associated with a mobile computing device provides a preferred list of locations and corresponding NATs to a component of the mobile computing device. The preferred list of locations and corresponding NATs provides information to the mobile computing device regarding priorities of NATs for various locations (e.g., based on mobile country code (MCC)/mobile network code (MNC)), but the preferred list of locations and corresponding NATs does not enable the SIM associated with the mobile computing device to control NAT selection. That is, the preferred list of locations and corresponding NATs is provided by the SIM to the component of the mobile computing device and the component can choose which of the NATs to use to access the network.

Techniques described herein enable a SIM to control NAT selection, thereby enabling a service provider to control NAT selection. As described above, the SIM can be associated with (e.g., store or otherwise have access to) a configuration table provided by a service provider (e.g., a telecommunications service provider, etc.). The service provider can dictate configurations in the configuration table and can update the configuration table over time. In some examples, the service provider can update the configuration table based on determining a change to an account of a subscriber (e.g., change to level of service, etc.), a characteristic of the network (e.g., change in quality of service (QoS), change in network traffic, etc.), and/or a device. The service provider can push such updates to the configuration table associated with the SIM of the mobile computing device. As such, the service provider can enable the configuration table to be updated over the air (e.g., in near-real time).

Such configurations can indicate which NATs (e.g., 2G, 3G, 4G, 5G, etc.) are permitted at particular dates, times, locations, and so on. In at least one example, such configurations can indicate which services (e.g., 5G router services, 5G streaming services, etc.) are permitted at particular dates, times, locations, and so on. In at least one example, the configurations associated with a configuration table can be determined based on business rules, price plans, levels of service, a device type, network condition(s), and so on. That is, the configurations associated with a configuration table can be particular to a single subscriber, a group of similar subscribers (e.g., subscribers that share one or more characteristics and/or are associated with a similarity score that exceeds a threshold), or a population of subscribers.

Take as an example, a subscriber that subscribes to services from Telecommunications Service Provider A. When that subscriber travels to another location that is outside of the home network for Telecommunications Service Provider A (i.e., the subscriber is roaming), techniques described herein can be implemented to determine which NAT the mobile computing device operable by the subscriber can use to access the network (of the Telecommunications Service Provider A). The SIM can utilize a configuration table to determine which roaming partner (e.g., to Telecommunications Service Provider A) NAT the mobile computing device can use to access the network. For instance, if the subscriber is associated with a first subscription tier for a roaming service, the configuration table may indicate that the mobile computing device can access 4G NAT via a roaming partner to Telecommunications Service Provider A. Whereas, for another subscriber that is not associated with the first subscription tier, the configuration table may indicate that the mobile computing device can access 3G NAT via a roaming partner to Telecommunications Service Provider A. In this way, Telecommunications Service Provider A can control (via the SIM) which NAT the mobile computing device is able to access while roaming.

Or, in an additional or alternative example, if a group of subscribers are located in a busy downtown area, to ensure the subscribers are receiving a positive user experience, different configuration tables can be used to differentiate which NAT individual of the subscribers use to access the network. For instance, subscribers associated with a first subscription tier can have configuration tables that enable them to access the network via 5G NAT, whereas subscribers that are not associated with the first subscription tier can have configuration tables that enable the subscribers that are not associated with the first subscription tier to access the network via 4G NAT. As such, techniques described herein can enable a telecommunications service provider to control (via the SIM) which NATs individual subscribers (e.g., mobile computing devices associated therewith) are able to access to manage network congestion and/or user experience.

Techniques described herein offer numerous improvements over existing NAT selection technology. For instance, techniques described herein enable service providers to implement roaming NAT control such that when subscribers (to services of the service providers) are roaming into regions associated with roaming partners of the service providers, the service providers can control that their subscribers are accessing certain NATs that provide the best user experience with the roaming partners, as described above. As such, techniques described herein enable service providers to control the QoS received by their subscribers using SIM-controlled NAT selection. Furthermore, techniques described herein enable service providers to reduce roaming expense and enhance profits. That is, in addition to controlling user experience using techniques described herein, SIM-controlled NAT selection can also reduce roaming costs incurred by service providers by making roaming devices connect to the NAT which incurs lowest cost.

In addition to the roaming benefits described above, techniques described herein can enable service providers to control network congestion and user experiences. For instance, service providers can control congestion by forcing devices to connect via a certain NAT if another NAT is determined to be congested. That is, if a NAT is determined to be congested (e.g., a congestion signal associated with the NAT satisfies a threshold), a service provider can update one or more configuration tables such to force at least some mobile computing devices off the congested NAT (i.e., terminate access to the congested NAT) and onto another NAT (e.g., enable access to the other NAT). Moreover, techniques described herein are directed to improving user experience for subscribers of a service offered by a service provider. For instance, a configuration table can include configurations that provide access to the "best NAT" (e.g., the NAT with the least congestion (or lower congestion) and/or faster transmission speeds) to a subscriber, the subscriber is able to enjoy the fastest network instead of connecting to other NATs that may have congestion and slower speeds at that moment. As such, techniques described herein can improve user experiences of telecommunication service subscribers.

Additional or alternative improvements can be observed throughout the discussion of FIGS. 1-6 below.

Figure 1:
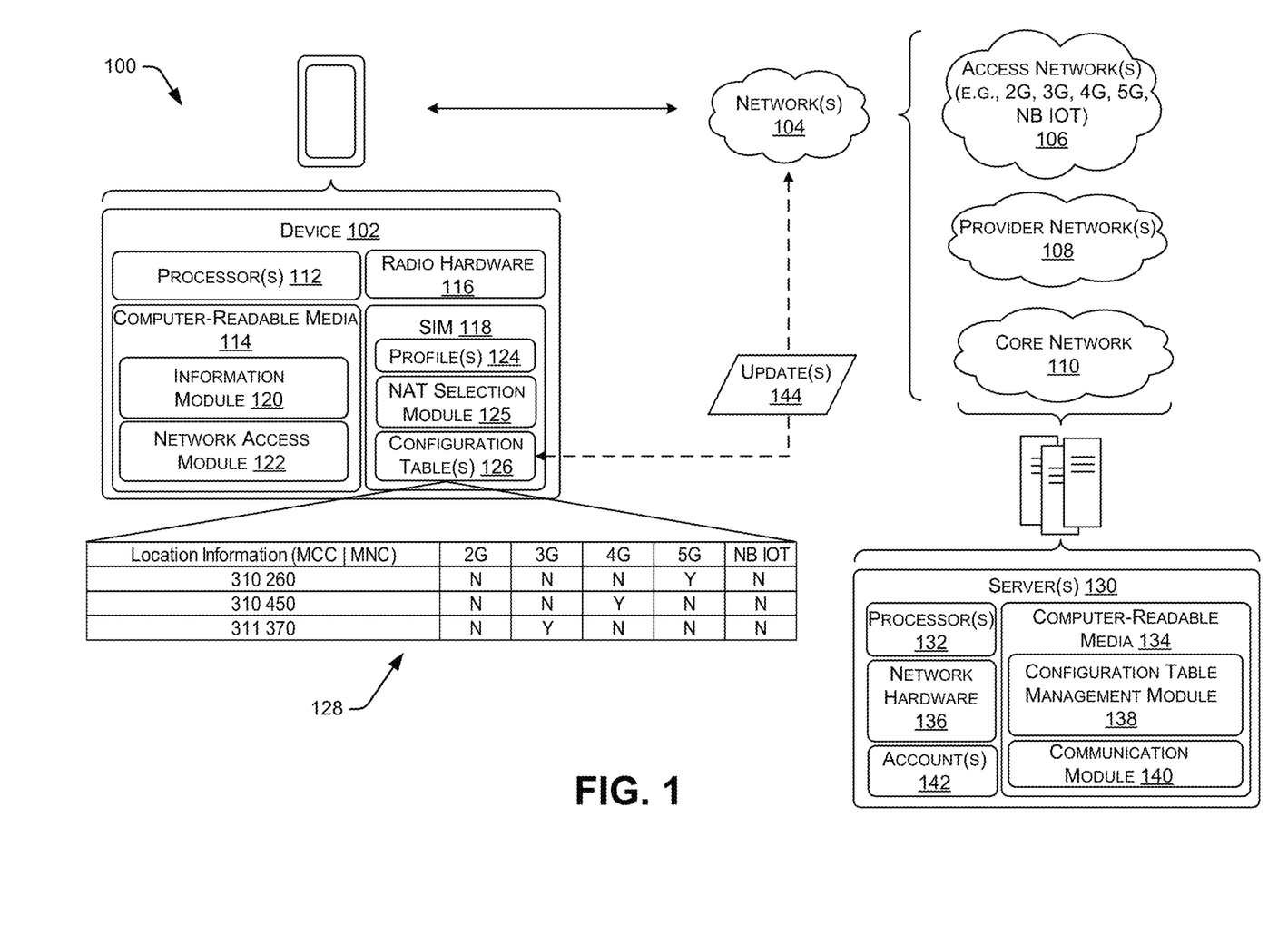
FIG. 1 illustrates an example environment for implementing intelligent network access technology (NAT) control, as described herein.

FIG. 1 illustrates an example environment 100 for implementing intelligent NAT control, as described herein. Environment 100 includes a device 102 that is in communication with one or more networks 104. The network(s) 104 can include access network(s) 106, provider network(s) 108, a core network 110 (which, in some examples can be a "carrier" network), etc.

An access network 106 is a network that connects subscribers (e.g., mobile computing devices associated therewith) to a service provider (e.g., a telecommunications service provider). The service provider can be associated with the core network 110. The core network 110 can connect one or more other service providers to one another. The one or more other service providers can be associated with the provider network(s) 108. Mobile computing devices, such as the device 102, can utilize various access technologies (e.g., NATs) to establish a connection to the access network(s) 106, the provider network(s) 108, the core network 110, and so forth. For example, mobile computing devices, such as the device 102, can support one or more NATs including, BLUETOOTH®, WI-FI®, GSM/2G, UMTS/3G, LTE/4G, NR/5G, etc.

2G is a digital NAT that launched on the GSM standard. 2G NAT enables higher efficiency on the electromagnetic spectrum (e.g., of radio frequencies allocated to the mobile industry and other sectors for communication over airwaves), which allows for greater penetration level for mobile computing devices. 2G technology supports mobile data services, such as SMS text messaging, picture messaging, multimedia messaging, etc. Further, 2G enables digital encryption.

3G is a NAT that launched on the UMTS standard. 3G technology provides an information transfer rate of at least 200 kilobits per second to several Megabits per second which enables 3G technology to be applied to wireless voice telephony, mobile Internet access, fixed wireless Internet access, video calls, mobile TV technologies, etc.

4G is an internet protocol (IP) based NAT with a capacity of 100 Megabits per second to 1 Gigabit per second. 4G technology delivers high quality, high speed, and high capacity (generally at low service costs). 4G technology is used for voice, multimedia, and internet over IP based data transmissions. Additional details associated with 4G technologies can be found in the International Mobile Telecommunications Advanced (IMT-Advanced) specification specified by the International Telecommunications Union-Radio (ITR-U). 4G technology is defined by the LTE standard.

5G is associated with the 5G NR standard. 5G technology has more capacity than 4G technology, supporting multiple (e.g., up to 35) Gigabits per second. 5G technology has the potential to deliver higher quality, higher speed, and higher capacity (at even lower costs) than 4G technology. Additionally, 5G technology has significantly lower latency than 4G technology, enabling faster load times. 5G technology can support voice, multimedia, and internet over IP based data transmissions, as well as supporting internet connected devices (Internet of Things (IOT)), autonomous vehicles, virtual and/or augmented reality advancements, and additional and/or alternative use cases.

In at least one example, the device 102 (which can additionally or alternatively be referred to herein as "a mobile computing device") can correspond to user equipment (UE) including, but not limited to, a smart phone, a personal digital assistant, a netbook, a laptop computer, a smart appliance, and/or another electronic device that is capable of transmitting or receiving audio, video, and/or data via the network(s) 104. In at least one example, the device 102 can include processor(s) 112, computer-readable media 114, radio hardware 116, and a SIM 118.

The processor(s) 112 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 112 can execute one or more modules and/or processes to cause the device 102 to perform a variety of functionalities, as set forth above and explained in further detail in the following disclosure. Additionally, each of the processor(s) 112 can possess its own local memory, which also can store program modules, program data, and/or one or more operating systems.

Depending on the exact configuration and type of the device 102, the computer-readable media 114, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disk read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 114 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 102. Any such non-transitory computer-readable media can be part of the device 102.

In contrast, communication media includes computer readable instructions, data structures, program modules, or other data in a modulated data signal, such as a carrier wave, or other transmission mechanism. As defined herein, computer storage media does not include communication media.

The computer-readable media 114 can include one or more modules and data structures including, for example, an information module 120 and a network access module 122. The one or more modules and data structures can be in the form of stand-alone applications, productivity applications, an operating system component, or any other application or software module configured to facilitate intelligent NAT selection, as described herein.

The information module 120 can be configured to access information associated with the device 102. In at least one example, the information module 120 can access information responsive to an event. An event can be a boot up of the device 102, a lapse of a predetermined period of time associated with a polling cycle, a change in location of the device 102, and so on. In some examples, the information module 120 can access the information responsive to receiving a request for such information from the SIM 118.

In at least one example, the information module 120 can send a request for information to the network(s) 104, which can respond to the request with at least some information. In an additional or alternative example, the information module 120 can access information from the device 102. In at least one example, the information module 120 can access location information, which can be any data that indicates a location of the device 102. For instance, location information can include, but is not limited to, a MCC, a MNC, a cell identifier, a location area code (LAC), etc. In additional or alternative examples, the information module 120 can access additional or alternative information, such as a timestamp of a current time, a datestamp associated with a current date, a current NAT (e.g., the NAT of which the device 102 is currently using to access the network(s) 104), etc.

The network access module 122 can be configured to send requests to access the network(s) 104 via particular NATs. In at least one example, the network access module 122 can send a request to the SIM 118. The request can indicate a NAT via which the network access module 122 desires to use to access the network(s) 104. In at least one example, the network access module 122 can receive an error from the SIM 118. The error can indicate that the device 102 cannot access the network(s) 104 via the requested NAT. In some examples, the error can indicate which NAT(s) are available for the device 102. Responsive to receiving an error, the network access module 122 can select an alternative NAT to attempt to access the network(s) 104. The network access module 122 can retry (with different NATs) until the network access module 122 is successful in accessing the network(s) 104 (i.e., the network access module 122 does not receive an error responsive to its request and/or a communication session is established). In some examples, the network access module 122 can fall back if a particular NAT is not available. That is, if a high-level NAT is not available, the network access module 122 can fall back to the next highest-level NAT. For instance, if 5G is not available, the network access module 122 can fall back to 4G and so on. In examples where the error includes an indication of NAT(s) that are available, the network access module 122 can select an alternative NAT from the NAT(s) indicated as available and can resend the request.

It should be noted, however, that in examples where a request is associated with an emergency call, any NAT can be selected and access to the selected NAT can be provided. That is, if a request is directed to a number or identifier known to be associated with an emergency services provider, all NATs may be available to the device 102 (per the configuration table(s) 126 or otherwise). In such an example, the highest-level NAT available may be selected or the most reliable NAT available may be selected for accessing the network(s) 104 to transmit the emergency call.

The radio hardware 116 provides wireless UE capabilities, such as connecting to a base station associated with the network(s) 104. The radio hardware 116 can include or be incorporated into processors, ASICs, programmable circuits such as FPGAs, or in other ways. In at least one example, the radio hardware 116 can include radios associated with one or more of the NATs (e.g., 2G, 3G, 4G, 5G, etc.). As described above, the radio hardware 116 can enable the device 102 to connect to a base station associated with the network(s) 104. Base stations (also known as cell sites or cell towers) can be associated with antennae and other electronic communications equipment (e.g., transceivers, digital signal processors, control electronics, a GPS receiver, etc.) to create a cell in a cellular network. The device 102 can include additional or alternative hardware to enable the device to access the network(s) 104 via additional or alternative NATs (e.g., BLUETOOTH®, WI-FI®, etc.).

The SIM 118 can be a SIM card or an eSIM (e.g., an embedded, electronic, and/or enhanced SIM). A SIM card can be a portable memory chip or an integrated memory chip. Generally, when a consumer opens an account associated with a service provider, such as a telecommunication service provider, the service provider can activate a SIM card of a mobile computing device associated with the account. That is, each SIM card includes a unique number printed on the memory chip which requires activation by the service provider (e.g., via a website associated with the service provider, via a call to the service provider, via provisioning by the service provider, etc.). Following activation of an account by the service provider, the subscriber, via the mobile computing device, can utilize various services offered by the service provider.

In some examples, for instance with an eSIM, a profile (e.g., an eSIM profile) including a unique number (i.e., associated with a service provider) and other data (e.g., account information (e.g., subscription key, identity and/or service plan profiles, etc.), restrictions, etc.) can be downloaded by a mobile computing device, and no further activation is required to activate an account associated with the service provider and/or otherwise use services available from the service provider. For instance, a local profile assistant (e.g., computer-readable instructions) associated with a mobile computing device can download a profile from a service provider and install the profile on the mobile computing device. As a result, the eSIM of the mobile computing device can be associated with the downloaded profile provided by the service provider. General profile provisioning is defined in GSMA RSP (Remote SIM Provisioning) for consumer devices technical specification standard SGP.22, for example.

The SIM 118 can store personal information of a subscriber, such as, but not limited to, data associated with a phone number of a subscriber associated with the device 102, an address book of the subscriber, text messages sent and received via the device 102, and other data. Additionally, in at least one example, the SIM 118 can store an indication of a current MCC, MNC, cell identifier, LAC, etc. In at least one example, the SIM 118 can be associated with an identifier. The identifier can be a unique code that is particular to the SIM 118. That is, the identifier can uniquely identify the SIM 118 that is associated with the device 102. In at least one example, the identifier can be an embedded Universal Integrated Circuit Card-Identifier (e.g., eUICC-ID, eID, etc.).

In at least one example, the SIM 118 can be associated with profile(s) 124. That is, the profile(s) 124 can be stored on the SIM 118 or can otherwise be accessible by the SIM 118. In at least one example, a profile 124 can indicate which service plans, services, functionalities, etc. are available for the device 102 from a particular service provider. For instance, a subscriber (e.g., an operator and/or an account holder) can operate the device 102. The subscriber can be an entity (e.g., person, company, etc.) that subscribes to services, such as telecommunication services, via a service plan. The service plan can indicate an amount of data, voice calling, and/or text messaging available to the device 102, whether data, voice calling, and/or text messaging is available internationally, data transmission speeds accessible to the device 102, etc. In at least one example, particulars of the service plan can be indicated in a profile of the profile(s) 124.

Additionally, the SIM 118 can include a NAT selection module 125. The NAT selection module 125, which can be in the form of a stand-alone application, productivity application, an operating system component, or any other application or software module configured to facilitate intelligent NAT selection. The NAT selection module 125 can access configuration table(s) 126, which can be stored on or otherwise available to the SIM 118. The configuration table(s) 126 can be look-up table(s) or other types of data structures for storing configurations as described herein. The configuration table(s) 126 can be provided to the SIM 118 from a service provider that is, for instance, associated with the core network 110. The service provider can dictate configurations in the configuration table(s) 126 and can update the configuration table(s) 126 over time. Such configurations can indicate which NATs are permitted at particular dates, times, locations, and so on. In at least one example, such configurations can indicate which services are permitted at particular dates, times, locations, and so on. For the purpose of this discussion, the configurations can be considered "NAT data" that indicates which NAT(s) are permissible for the device 102 to utilize to access the network(s) 104. That is, NAT data is data (e.g., configurations) provided by the core network 110 for controlling which NATs the device 102 is permitted to use to access the network(s) 104.

A non-limiting example of a configuration table 128 is illustrated in FIG. 1. In the illustrated example, the configuration table 128 includes three rows of location information (e.g., MCC and MNC) and a plurality of columns, each corresponding to a different NAT. Individual cells include a "Y" (for "yes") or "N" (for "no") to indicate whether a particular NAT is available for a particular location (as determined based on the location data). Of course, other indications can be used to indicate whether a particular NAT is available for a particular location. Additionally, additional or alternative location data, timing data, date data, etc. can be included in the configuration table 128. Further, additional or alternative NATs can be included in the configuration table 128. In some examples, two or more NATs can be available to the device 102 associated with a particular location, date, time, etc. In such examples, the NAT selection module 125 can utilize one or more priority rules (e.g., associated with an additional or alternative file) to determine which NAT to permit the device 102 to use to access the network(s) 104.

In at least one example, the configuration table(s) 126 can include indications of whether services are permissible in certain locations (e.g., based on location data), dates, times, etc. For example, with 5G, the device 102 can serve as a router. However, enabling devices to serve as routers may be a service that is selectively available (e.g., due to the increased use of network resources). Accordingly, router services can be indicated as available to some subscribers, but not available to other subscribers, in the configuration table(s) 126. Or, as another example, with 5G, different streaming services may be available in different locations. For instance, if a subscriber is in the northwestern part of the United States, streaming services associated with northwestern sports teams may be available to the subscriber, whereas the streaming services associated with the northwestern sports teams may not be available to a subscriber in the southern part of the United States (and instead streaming services associated with southern sports teams may be available). Accordingly, particular streaming services may be indicated as available (or not) in the configuration table(s) 126.

In at least one example, the configurations associated with the configuration table(s) 126 can be determined based on business rules, price plans, levels of service, device type, network condition, and so on. That is, the configurations associated with the configuration table(s) 126 can be particular to a single subscriber, a group of similar subscribers (e.g., subscribers that share one or more characteristics and/or are associated with a similarity score that exceeds a threshold), or a population of subscribers. As described below, a service provider (e.g., associated with the core network 110) can determine configurations for controlling NAT selection and can provide such configurations to devices, such as the device 102, over the air (e.g., in near-real time).

In at least one example, the NAT selection module 125 can utilize the configuration table(s) 126 to control NAT selection by the device 102. In at least one example, an event associated with the device 102 can be detected. In some examples, the NAT selection module 125 can detect the event. In other examples, the information module 120 can detect the event. In either example, responsive to the event being detected, the NAT selection module 125 can access information associated with the device 102. In some examples, the NAT selection module 125 can send a request for such information to the information module 120 and the information module 120 can provide such information to the NAT selection module 125. In at least one example, the NAT selection module 125 can access location information (e.g., a MCC, a MNC, a cell identifier, a location area code, etc.), a timestamp, a datestamp, a current NAT (e.g., the NAT that the device 102 is currently using to access the network(s) 104), etc. without reliance upon the information module 120. The NAT selection module 125 can access the configuration table(s) 126 storing NAT data and the NAT selection module 125 can determine, based at least in part on the NAT data and the information associated with the device 102, whether a requested NAT of the device 102 is a permissible NAT for the device 102 in the location (or other situation).

If the requested NAT is not permissible per the configuration table(s) 126, the SIM can cause the device 102 to connect to the network(s) 104 via an alternate NAT. That is, responsive to receiving a request (e.g., from the network access module 122) to access the network(s) 104 via an impermissible NAT, the NAT selection module 125 can return an error. Such an error prompts the network access module 122 to select an alternate NAT to access the network(s) 104. As such, the NAT selection module 125 is able to control NAT selection of the device 102 using configurations that are represented in the configuration table(s) 126. In some examples, the error can additionally include an indication of which NAT(s) are available to the device 102. In other examples, the error may not include such information and, in such examples, the device 102 (e.g., the network access module 122) can determine which NAT to try in an effort to access the network(s) 104.

As a non-limiting example, if the device 102 is associated with location information indicating an MCC of 310 and an MNC of 450, and the network access module 122 submits a request to access the network(s) 104 via 5G NAT, the SIM 118 may return an error indicating that the device 102 is not permitted to access the network(s) 104 via 5G NAT (pursuant to the configuration table 128). However, if the network access module 122 submits a request to access the network(s) 104 via 4G NAT, the SIM 118 may permit the device 102 to access the network(s) 104 via 4G NAT base on the configurations of the configuration table 128. Additional details are described below with reference to FIGS. 2 and 3.

As described above, in some examples, the configuration table(s) 126 can indicate services available to the device 102. In such examples, the NAT selection module 125 can utilize information associated with the device 102 to determine which services to avail to the device 102 using the configuration table(s) 126. Additional details are described below with reference to FIG. 4.

While FIG. 1 illustrates that the NAT selection module 125 and the configuration table(s) 126 are stored in association with the SIM 118, in an additional or alternative example, the NAT selection module 125 and the configuration table(s) 126 can be stored in the computer-readable media 114. In such an example, the NAT selection module 125 can determine which NAT the device 102 is able to use to access the network(s) 104 and the network access module 122 can send a request to the SIM 118 to access the network(s) 104 via the determined NAT.

In at least one example, the core network 110 can be associated with one or more server computing devices (e.g., server(s) 130). The server(s) 130 can be any type of server, such as a network-accessible server. In some examples, the server(s) 130 can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed by the device 102 instead of, or in addition to, the server(s) 130. Similarly, in some examples, one or more of the functionalities described herein as being performed by the device 102 can be performed by the server(s) 130 instead of, or in addition to, the device 102.

In various examples, each of the server(s) 130 can be associated with one or more processors 132, computer-readable media 134, and network hardware 136. The processor(s) 132 can have the same and/or similar structure and/or function as the processor(s) 112, described above. The computer-readable media 134 can have the same or similar structure and/or function as the computer-readable media 114 described above. The network hardware 136 can provide wired or wireless networking capabilities to the server(s) 130. The network hardware 136 can include or be incorporated into processors, ASICs, programmable circuits such as FPGAs, or in other ways.

In at least one example, the computer-readable media 134 can include a configuration table management module 138 and a communication module 140. The one or more modules and data structures can be in the form of stand-alone applications, productivity applications, an operating system component, or any other application or software module configured to facilitate intelligent NAT selection, as described herein.

The configuration table management module 138 can be configured to manage configuration tables, such as the configuration table(s) 126 described above. In at least one example, the configuration table management module 138 can access account(s) 142 associated with subscribers to determine how to configure the configuration table(s) 126. The account(s) 142 can be stored locally with the server(s) 130 (as illustrated) and/or be stored remotely and be accessible to the server(s) 130. The account(s) 142 can store data associated with subscribers, including but not limited to, data associated with subscriber identities corresponding to account holders (e.g., subscribers) associated with mobile computing devices, phone numbers of the account holders, address books of the account holders, text messages sent and received via the mobile computing devices, identity and/or service plan profiles (e.g., amount of data, voice calling, and/or text messaging available, whether data, voice calling, and/or text messaging is available internationally, data transmission speeds accessible, plan restrictions, etc.), etc.

As described above, the configurations associated with the configuration table(s) 126 can be determined based on business rules, price plans, levels of service, device type, network condition, and so on. As such, the configuration table management module 138 can utilize data stored in the account(s) 142 and/or otherwise available to the configuration table management module 138 to determine configurations associated with the configuration table(s) 126. In some examples, the configurations associated with the configuration table(s) 126 can be particular to a single subscriber, a group of similar subscribers (e.g., subscribers that share one or more characteristics and/or are associated with a similarity score that exceeds a threshold), or a population of subscribers. In at least one example, machine-learning mechanisms (e.g., supervised, unsupervised, deep learning based, etc.) can be used by the configuration table management module 138 to determine configurations associated with the configuration table(s) 126.

In some examples, the configuration table management module 138 can update configurations of the configuration table(s) 126. For example, the configuration table management module 138 can determine a change to an account of a subscriber (e.g., change to level of service, etc.), a characteristic of the network(s) 104 (e.g., change in QoS, change in network traffic, etc.), and/or the device 102 and can update configurations of the configuration table(s) 126 based on such change(s). In such an example, the configuration table management module 138 can push such updates to the configuration table(s) 126 associated with the SIM 118 of the device 102. For instance, in at least one example, the configuration table management module 138 can send an instruction 144 instructing the SIM 118 to update the configuration table(s) 126. In an additional or alternative example, the configuration table management module 138 can send updated configuration table(s) to the SIM 118, which can replace the existing configuration table(s) 126. In at least one example, such updates can be provided over the air (e.g., in near-real time). Additional details are described below with reference to FIG. 6.

The communication module 140 can be configured to establish and facilitate communications between devices, such as the device 102, and the network(s) 104.

The processes described below in association with FIGS. 2-6 can be implemented in hardware, software, or a combination thereof. The example processes are described in the context of the environment of FIG. 1 but are not limited to that environment. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

Figure 2:
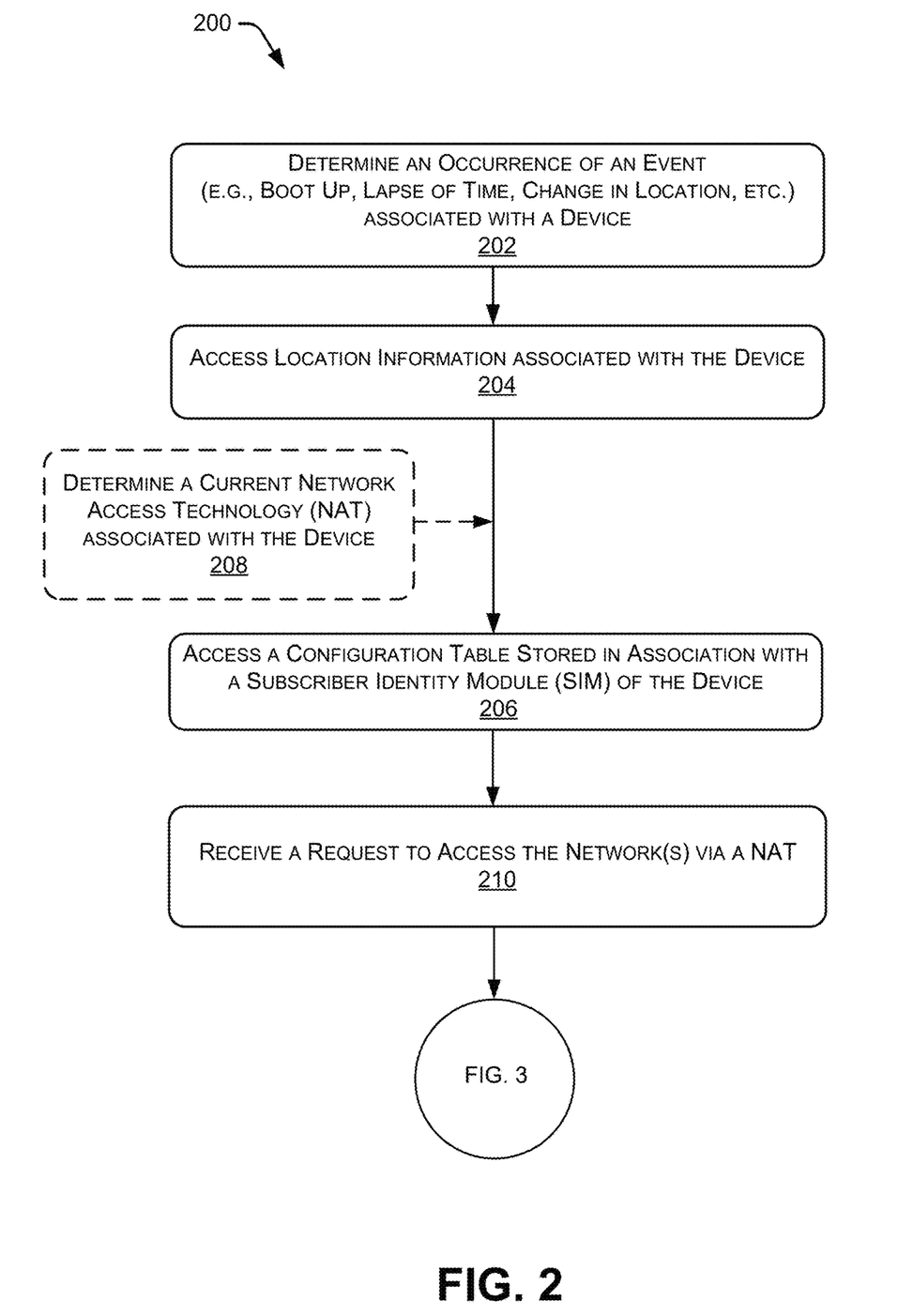
FIG. 2 illustrates an example process for implementing intelligent NAT control, as described herein.

FIG. 2 illustrates an example process 200 for implementing intelligent NAT control, as described herein.

Block 202 illustrates determining an occurrence of an event (e.g., boot up, lapse of time, change in location, etc.) associated with a device. As described above, in at least one example, an event associated with the device 102 can be detected. An event can be a boot up of the device 102, a lapse of a predetermined period of time associated with a polling cycle, a change in location of the device 102, and so on. In some examples, the NAT selection module 125 can detect the event. In other examples, the information module 120 can detect the event.

Block 204 illustrates accessing location information associated with the device. Responsive to the event being detected, the NAT selection module 125 can access information associated the device 102. In at least one example, the information module 120 can access information responsive to the event being detected and can provide the information to the NAT selection module 125. In additional or alternative examples, the information module 120 can access the information responsive to receiving a request for such information from the SIM 118 and provide the information to the SIM 118 responsive to receiving the request. That is, in some examples, the NAT selection module 125 can send a request for such information to the information module 120 and the information module 120 can provide such information to the NAT selection module 125. In at least one example, the NAT selection module 125 can access location information without interacting with the information module 120.

In at least one example, the information module 120 and/or the NAT selection module 125 can send a request for information to the network(s) 104, which can respond to the request with at least some information. In an additional or alternative example, the information module 120 and/or the NAT selection module 125 can access information from the device 102. In at least one example, the information module 120 and/or the NAT selection module 125 can access location information, which can be any data that indicates a location of the device 102. For instance, location information can include, but is not limited to, a MCC, a MNC, a cell identifier, LAC, etc. In additional or alternative examples, the information module 120 and/or the NAT selection module 125 can access additional or alternative information, such as a timestamp of a current time, a datestamp associated with a current date, a current NAT (e.g., the NAT of which the device 102 is currently using to access the network(s) 104), etc.

Block 206 illustrates accessing a configuration table stored in association with a subscriber identity module (SIM) of the device. As described above, the NAT selection module 125 can access configuration table(s) 126, which can be stored on or otherwise available to the SIM 118. The configuration table(s) 126 can be provided to the SIM 118 from a service provider that is, for instance, associated with the core network 110. The service provider can dictate configurations in the configuration table(s) 126 and can update the configuration table(s) 126 over time. Such configurations can indicate which NATs are permitted at particular dates, times, locations, and so on. As described above, the configurations can be considered "NAT data" that indicate which NAT(s) are permissible for the device 102 to utilize to access the network(s) 104. That is, NAT data is data (e.g., configurations) provided by the core network 110 for controlling which NATs the device 102 is permitted to use to access the network.

In at least one example, the NAT selection module 125 can access the configuration table(s) 126 based at least in part on receiving information (e.g., location information) from the information module 120. In additional or alternative examples, the NAT selection module 125 can access the configuration table(s) 126 based at least in part on receiving a request to access the network(s) 104 via a particular NAT.

In some examples, prior to accessing the configuration table the SIM 118 (e.g., the NAT selection module 125) can determine a current NAT associated with the device 102, as illustrated in block 208.

Block 210 illustrates receiving a request to access the network(s) via a NAT. As described above, the network access module 122 can be configured to send requests to access the network(s) 104 via particular NATs. In at least one example, the network access module 122 can send a request to the SIM 118. The request can indicate a NAT via which the network access module 122 desires to use to access the network(s) 104. In some examples, the NAT can correspond to a current NAT of the device 102. In additional or alternative examples, the NAT can correspond to an alternative NAT. In at least one example, the SIM 118 can receive the request and can determine whether to permit the device 102 to access the network(s) 104 using the NAT, as described below with reference to FIG. 3.

Figure 3:
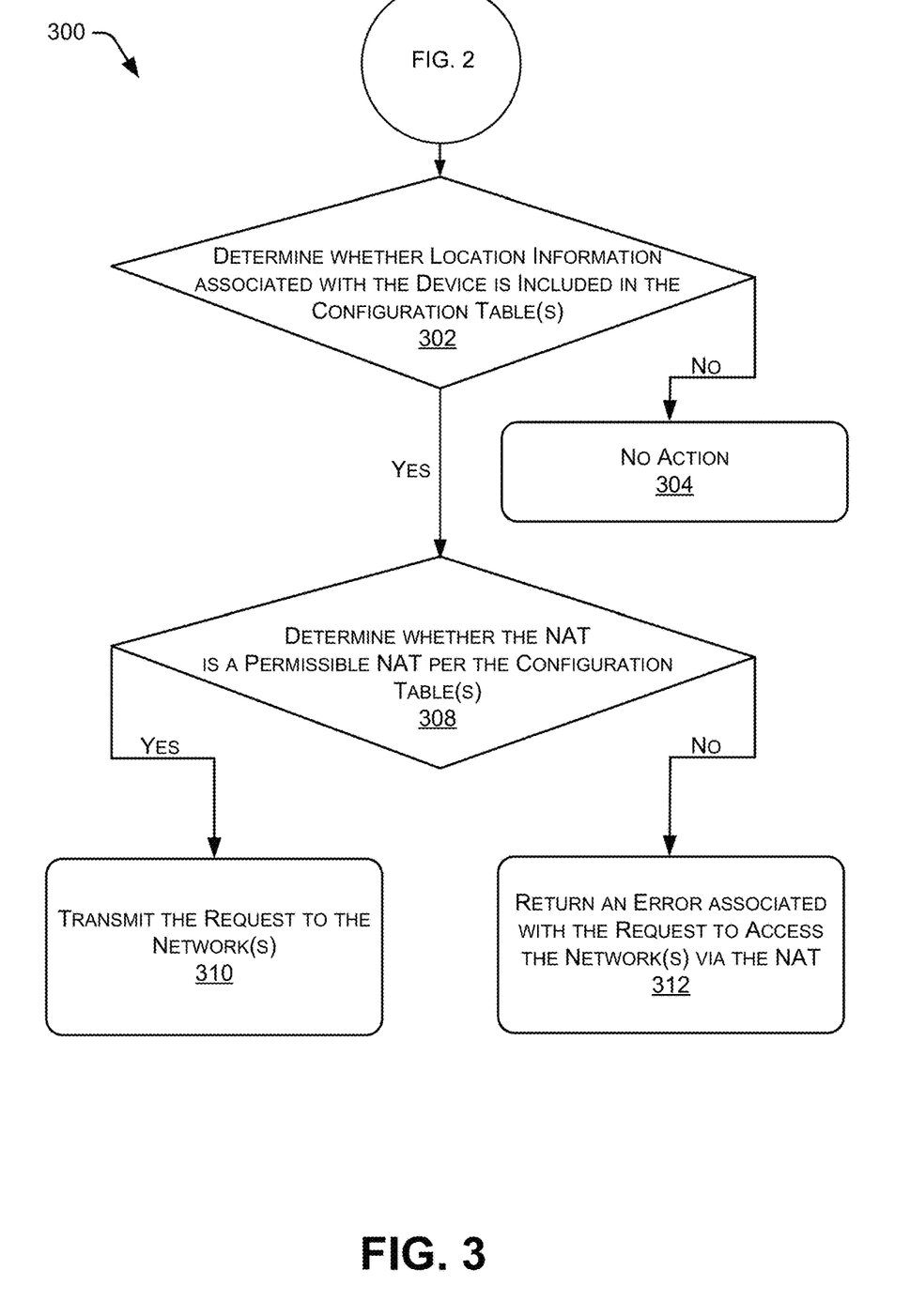
FIG. 3 illustrates additional details associated with the example process of FIG. 2.

FIG. 3 illustrates an example process 300 including additional details associated with the example process of FIG. 2.

Block 302 illustrates determining whether location information associated with the device is included in the configuration table. In at least one example, the NAT selection module 125 can analyze the configuration table(s) 126 to determine whether the location information associated with the device 102 is included in the configuration table(s) 126. If the location information associated with the device 102 is not included in the configuration table(s) 126, the SIM can refrain from taking an action (e.g., "no action), as illustrated in block 304. The location information may be omitted from the configuration table(s) 126 if the service provider does not desire, or is not able, to control NAT access in a corresponding location. If the location information associated with the device 102 is included in the configuration table(s) 126, the NAT selection module 125 can determine whether the NAT is a permissible NAT per the configuration table(s) 126, as illustrated in block 308. That is, the NAT selection module 125 can determine whether the NAT requested is indicated as available for the device 102, in view of the location information (or other information) associated therewith.

If the NAT is a permissible NAT per the configuration table(s) 126, the NAT selection module 125 can transmit the request to the network(s) 104, as illustrated in block 310. That is, the SIM 118 can transmit the request to the network(s) 104 and the communication module 140 can establish a connection with the network(s) 104 using the NAT. If the NAT is not a permissible NAT per the configuration table(s) 126, the NAT selection module 125 can return an error associated with the request to access the network(s) 104 via the NAT, as illustrated in block 310. If the requested NAT is not permissible per the configuration table(s) 126, the SIM 118 can cause the device 102 to connect to the network via an alternate NAT. That is, responsive to receiving a request (e.g., from the network access module 122) to access the network(s) 104 via an impermissible NAT, the NAT selection module 125 can return an error. Such an error prompts the network access module 122 to select an alternate NAT to access the network(s) 104. As such, the NAT selection module 125 is able to control NAT selection of the device 102 using configurations that are represented in the configuration table(s) 126. In some examples, the error can additionally include an indication of which NAT(s) are available or are not available to the device 102. In other examples, the error may not include such information and, in such examples, the device 102 (e.g., the network access module 122) can determine which NAT to try in an effort to access the network(s) 104.

Figure 4:
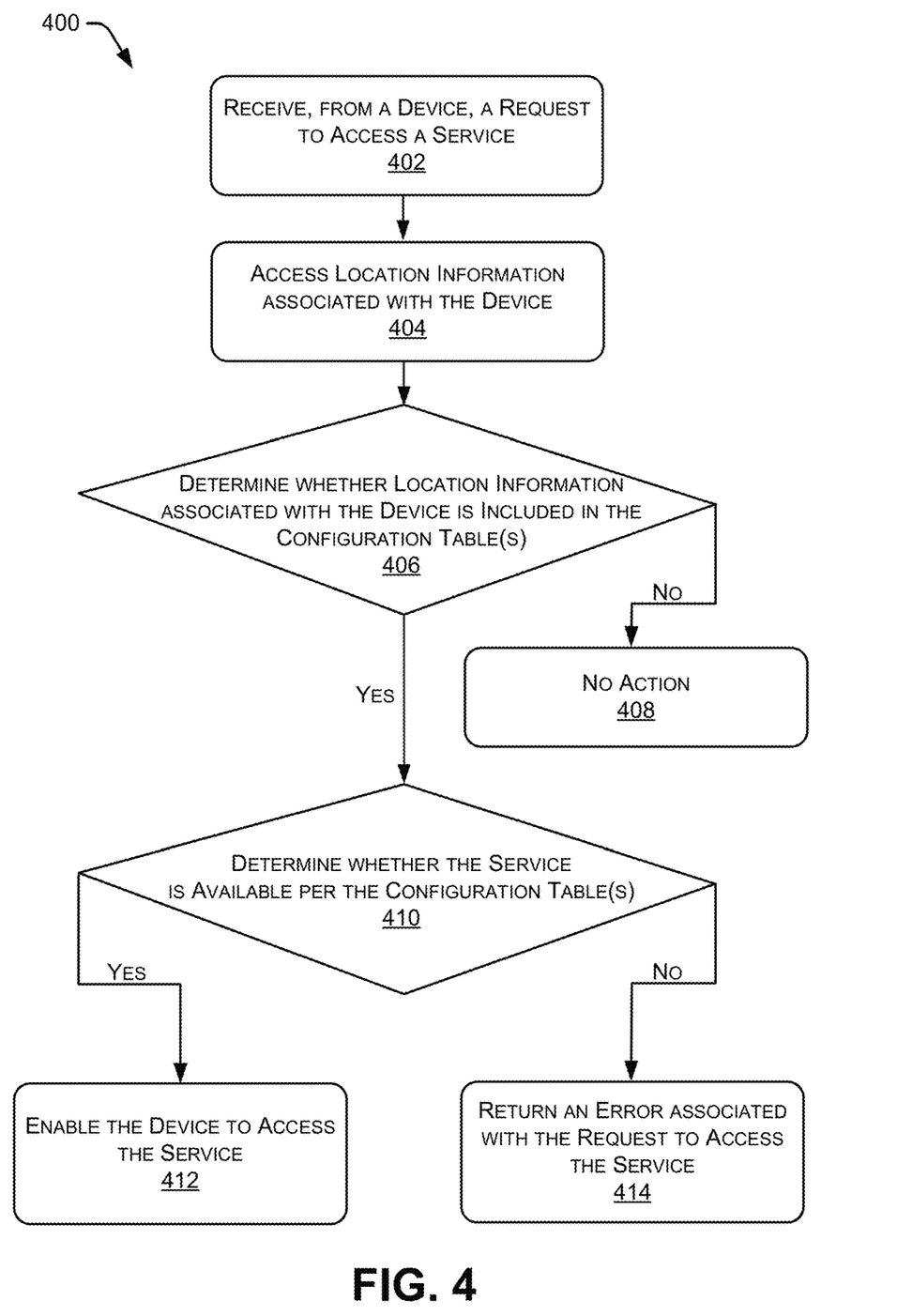
FIG. 4 illustrates an example process for implementing intelligent service control, as described herein.

FIG. 4 illustrates an example process 400 for implementing intelligent service control, as described herein.

Block 402 illustrates receiving, from a device, a request to access a service. In at least one example, the network access module 122 can be configured to send requests to access services that are available via particular NATs. In at least one example, the network access module 122 can send a request to the SIM 118. The request can indicate a service of which the network access module 122 desires to access via the particular NAT. In at least one example, the SIM 118 can receive the request and can determine whether to permit the device 102 to access the service.

Block 404 illustrates accessing location information associated with the device. Responsive to receiving a request to access a service, the NAT selection module 125 can access information associated the device 102. In at least one example, the information module 120 can access the information responsive to receiving a request for such information from the SIM 118. That is, in some examples, the NAT selection module 125 can send a request for such information to the information module 120 and the information module 120 can provide such information to the NAT selection module 125. In at least one example, the NAT selection module 125 can access location information without interacting with the information module 120 and/or the location information can be provided with the request.

As described above, in at least one example, the information module 120 and/or the NAT selection module 125 can send a request for information to the network(s) 104, which can respond to the request with at least some information. In an additional or alternative example, the information module 120 and/or the NAT selection module 125 can access information from the device 102. In at least one example, the information module 120 and/or the NAT selection module 125 can access location information, which can be any data that indicates a location of the device 102. For instance, location information can include, but is not limited to, a MCC, a MNC, a cell identifier, LAC, etc. In additional or alternative examples, the information module 120 and/or the NAT selection module 125 can access additional or alternative information, such as a timestamp of a current time, a datestamp associated with a current date, a current NAT (e.g., the NAT of which the device 102 is currently using to access the network(s) 104), etc.

Block 406 illustrates determining whether location information associated with the device is included in the configuration table. In at least one example, the NAT selection module 125 can analyze the configuration table(s) 126 to determine whether the location information associated with the device 102 is included in the configuration table(s) 126. If the location information associated with the device 102 is not included in the configuration table(s) 126, the SIM can refrain from taking an action (e.g., "no action), as illustrated in block 408. The location information may be omitted from the configuration table(s) 126 if the service provider does not desire, or is not able, to control access to services in a corresponding location. If the location information associated with the device 102 is included in the configuration table(s) 126, the NAT selection module 125 can determine whether the service is available per the configuration table(s) 126, as illustrated in block 410.

If the service is available per the configuration table(s) 126, the NAT selection module 125 can enable the device to access the service, as illustrated in block 412. That is, if the NAT selection module 125 determines that the service is available to the device 102, the NAT selection module 125 can forward the request to the network(s) 104 and the communication module 140 can make streaming services available for the device 102. If the service is not available per the configuration table(s) 126, the NAT selection module 125 can return an error associated with the request to access the service as illustrated in block 412.

While FIGS. 2-5 make reference to using location information to control NAT selection and/or service selection in a particular location, in additional or alternative examples, time information, date information, etc. can be used to control NAT selection and/or service selection at particular times, dates, etc. That is, in some examples, time and/or date can additionally or alternatively be used to determine which NAT(s) are available to the device 102 and/or which services are available to the device 102.

Figure 5:
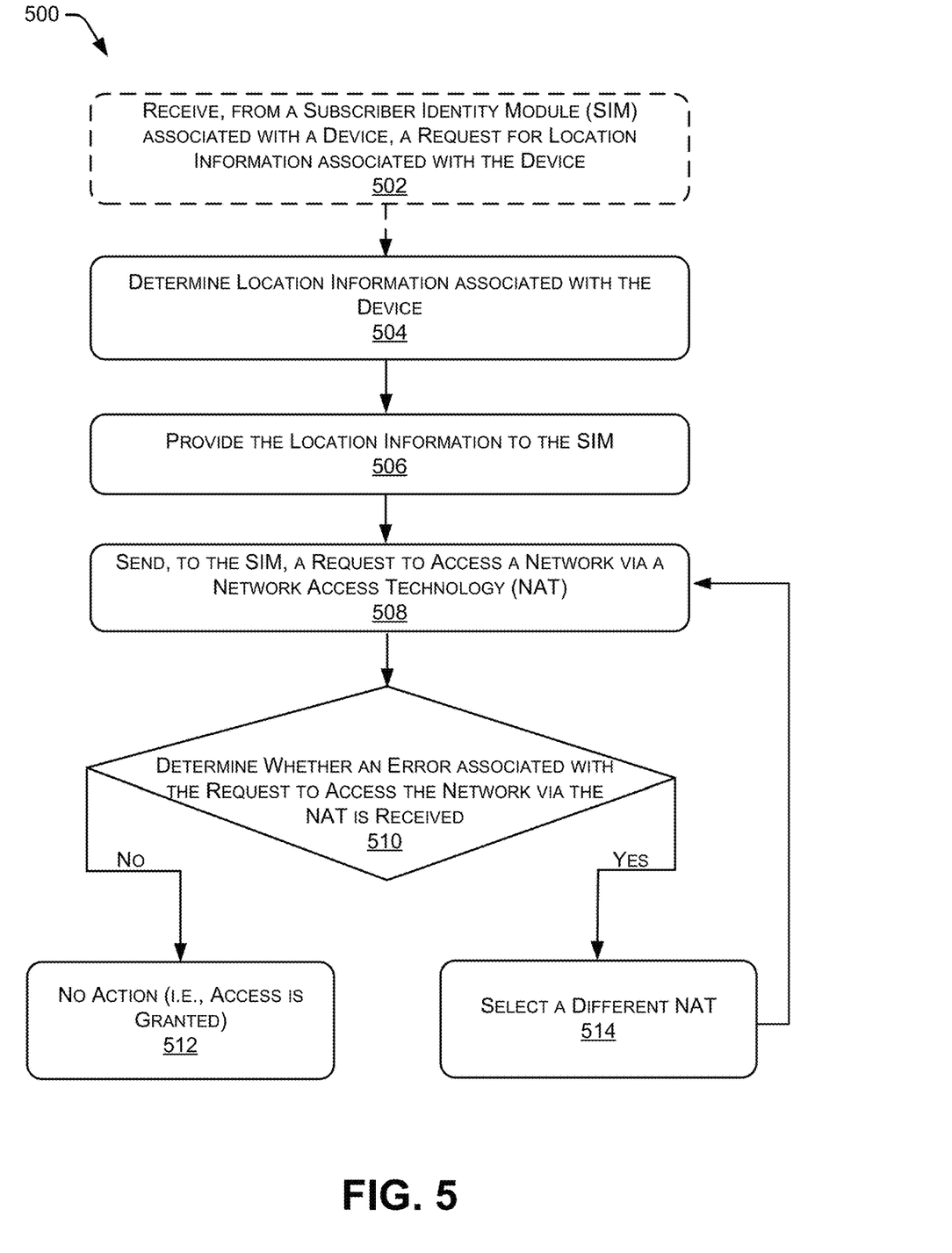
FIG. 5 illustrates an example process for accessing a network via a NAT based on intelligent NAT control, as described herein.

FIG. 5 illustrates an example process 500 for accessing a network via a NAT based on intelligent NAT control, as described herein.

Block 502, which can be optional in some examples, illustrates receiving, from a subscriber identity module (SIM) associated with a device, a request for location information associated with the device. In at least one example, the information module 120 can receive a request to access information associated with the device 102 from the SIM 118.

Block 504 illustrates determining location information associated with the device. In at least one example, the information module 120 can send a request for information to the network(s) 104, which can respond to the request with at least some information. In an additional or alternative example, the information module 120 can access information from the device 102. In at least one example, the information module 120 can access location information, which can be any data that indicates a location of the device 102. For instance, location information can include, but is not limited to, a MCC, a MNC, a cell identifier, LAC, etc. In additional or alternative examples, the information module 120 can access additional or alternative information, such as a timestamp of a current time, a datestamp associated with a current date, a current NAT (e.g., the NAT of which the device 102 is currently using to access the network(s) 104), etc.

Block 506 illustrates providing the location information to the SIM. In at least one example, the information module 120 can provide the location information to the SIM 118 for use in selecting a NAT for use by the device 102.

Block 508 illustrates sending, to the SIM, a request to access a network via a NAT. As described above, the network access module 122 can be configured to send requests to access the network(s) 104 via particular NATs. In at least one example, the network access module 122 can send a request to the SIM 118. The request can indicate a NAT via which the network access module 122 desires to use to access the network(s) 104. In some examples, the NAT can correspond to a current NAT of the device 102. In additional or alternative examples, the NAT can correspond to an alternative NAT.

Block 510 illustrates determining whether an error associated with the request to access the network via the NAT is received. As described above with reference to FIG. 3, the NAT selection module 125 can utilize the configuration table(s) 126 to control NAT selection by the device 102. In at least one example, the NAT selection module 125 can utilize the location information to determine, based at least in part on the configuration table(s) 126 and the location information associated with the device 102, whether a requested NAT of the device 102 is a permissible NAT for the device 102 in the location (or other situation). If the requested NAT is not permissible per the configuration table(s) 126, the NAT selection module 125 can return an error. The network access module 122 can analyze responses received from the SIM 118 to determine whether the request was accepted (e.g., no error received) or denied (e.g., error is received). If an error is not received, the network access module 122 can take no action (i.e., access is granted), as illustrated in block 512. That is, if no error is received, the device 102 can access the network(s) 104 via the NAT requested.

If an error is received, the network access module 122 can select a different NAT, as illustrated in block 514, and then process 500 can return to block 508. Responsive to receiving an error, the network access module 122 can select an alternative NAT to attempt to access the network(s) 104. The network access module 122 can retry (with different NATs) until the network access module 122 is successful in accessing the network(s) 104 (i.e., the network access module 122 does not receive an error responsive to its request or a communication session is otherwise established). In some examples, if a high-level NAT is not available, the network access module 122 can fall back to the next highest-level NAT, as described above. In examples where the error includes an indication of NAT(s) that are available, the network access module 122 can select an alternative NAT from the NAT(s) indicated as available.

Figure 6:
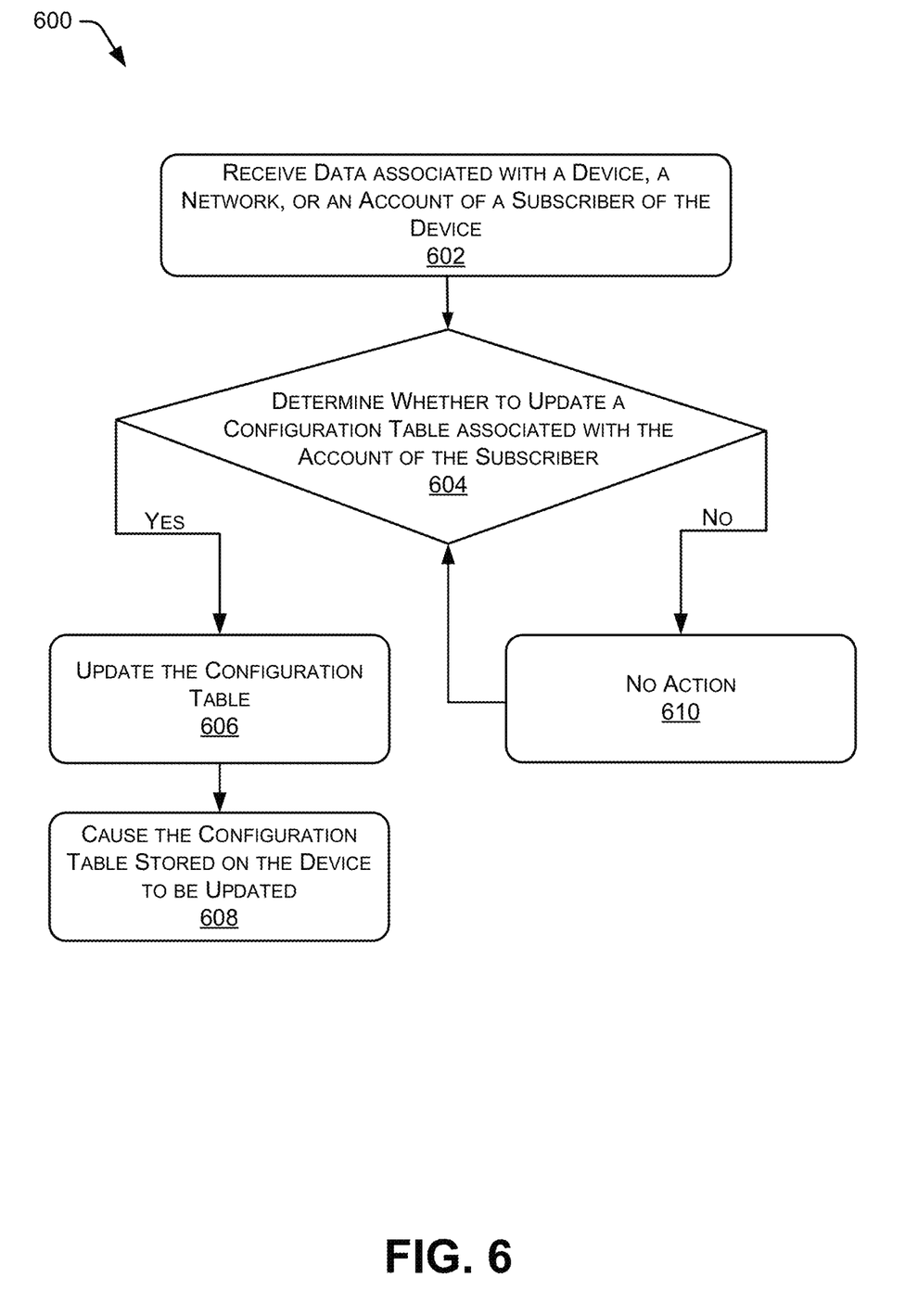
FIG. 6 illustrates an example process for updating a configuration table used by a SIM of a mobile computing device for implementing intelligent NAT control, as described herein.

FIG. 6 illustrates an example process 600 for updating a configuration table used by a SIM of a mobile computing device for implementing intelligent NAT control, as described herein.

Block 602 illustrates receiving data associated with a device, a network, or an account of a subscriber associated with the device. The configuration table management module 138 can be configured to manage configuration tables, such as the configuration table(s) 126 described above. In at least one example, the configuration table management module 138 can receive data associated with device(s), the network(s) 104, and/or account(s) of subscriber(s).

In at least one example, the configuration table management module 138 can analyze the data to whether to update a configuration table associated with the account of the subscriber, as block 604 illustrates. That is, the configuration table management module 138 can determine a change to an account of a subscriber (e.g., change to level of service, etc.), a characteristic of the network (e.g., change in QoS, change in network traffic, etc.), and/or a device and can determine to update configurations of the configuration table(s) 126 based on such change(s). For instance, the configuration table management module 138 can determine that a QoS associated with a network of the network(s) 104 drops below a threshold or congestion of a network of the network(s) 104 satisfies a threshold. Responsive to determining that the QoS associated with the network of the network(s) 104 drops below the threshold or congestion of the network of the network(s) 104 satisfies the threshold, the configuration table management module 138 can determine to update one or more configuration tables. As an additional or alternative example, the configuration table management module 138 can determine that an account of a subscriber has an updated pricing plan. Responsive to determining the update to the account of the subscriber, the configuration table management module 138 can determine to update a configuration table associated with the account.

Block 606 illustrates updating the configuration table. Based at least in part on determining that an update to a configuration table is warranted, the configuration table management module 138 can update the configuration table. In at least one example, machine-learning mechanisms (e.g., supervised, unsupervised, deep learning based, etc.) can be used by the configuration table management module 138 to determine configurations associated with configuration table(s) and/or updates to the configuration table(s). In some examples, an update can update a single configuration table associated with a single subscriber, a plurality of configuration tables associated with a plurality of subscribers (e.g., a cohort), or all configuration tables associated with a population of subscribers.

Block 608 illustrates causing the configuration table stored on the device to be updated. In at least one example, the configuration table management module 138 can push such updates to the device 102. For instance, in at least one example, the configuration table management module 138 can send an instruction 144 instructing the SIM 118 to update the configuration table(s) 126. In an additional or alternative example, the configuration table management module 138 can send updated configuration table(s) to the SIM 118, which can replace the existing configuration table(s) 126. In at least one example, such updates can be provided over the air (e.g., in near-real time).

Block 610 illustrates taking no action. Based at least in part on determining that an update to a configuration table is not warranted, the configuration table management module 138 can refrain from taking an action and process 600 can return to block 604. In some examples, the configuration table management module 138 can determine whether to update configuration table(s) at a particular frequency, responsive to determining a change to a device, the network(s) 104, and/or account(s) of subscriber(s), etc.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A computer-implemented method for implementing network access technology control, the computer-implemented method comprising:
    responsive to detecting an event associated with a mobile computing device, accessing location information associated with a location of the mobile computing device;
    accessing a configuration table stored in association with a subscriber identity module (SIM) of the mobile computing device, wherein the configuration table indicates permissible network access technologies for the mobile computing device to utilize at each of one or more locations;
    determining, based at least in part on the configuration table, on network access technology data provided by a network and on the location information, that a current network access technology of the mobile computing device is an impermissible network access technology for the mobile computing device in the location;
    generating, by the SIM and based at least in part on determining that the current network access technology is the impermissible network access technology for the mobile computing device in the location, an error notification configured to prohibit the mobile computing device from connecting to the network via the current network access technology; and
    sending, from the SIM to another component of the mobile computing device, the error notification, the error notification including an indication of at least one alternate network access technology.

2. The computer-implemented method as claim 1 recites, wherein the event comprises a boot up of the mobile computing device.

3. The computer-implemented method as claim 1 recites, wherein the event comprises a lapse of a preconfigured period of time associated with a polling cycle.

4. The computer-implemented method as claim 1 recites, wherein the event comprises a change from a previous location of the mobile computing device to the location of the mobile computing device.

5. The computer-implemented method as claim 1 recites, wherein the location information comprises at least one of a mobile country code, a mobile network code, a cell identifier, or a location area code.

6. The computer-implemented method as claim 1 recites, further comprising:
    receiving, by the SIM, a first request associated with a different network access technology than the current network access technology;
    determining, based at least in part on the network access technology data and the location information, whether the different network access technology is a permissible network access technology for the mobile computing device in the location; and
    based at least in part on determining that the different network access technology is the permissible network access technology for the mobile computing device in the location, sending, from the SIM to the network, a second request to access the network via the different network access technology.

7. The computer-implemented method as claim 1 recites, wherein the configuration table is customized for a subscriber profile associated with the mobile computing device.

8. The computer-implemented method as claim 1 recites, further comprising receiving, from one or more server computing devices associated with the network, an instruction to update the configuration table, wherein the instruction is received (i) in near-real time and (ii) responsive to a change in at least one of network traffic or a quality of service associated with the network.

9. One or more non-transitory computer-readable media storing instructions that, when executed by one or more processors, cause the one or more processors to perform operations comprising:
  detecting an event associated with a mobile computing device;
  accessing location information associated with a location of the mobile computing device;
  accessing a configuration table stored in association with a subscriber identity module (SIM) of the mobile computing device, wherein the configuration table indicates permissible network access technologies for the mobile computing device to utilize at each of one or more locations;
  determining, based at least in part on the configuration table, on network access technology data provided by a network, and on the location information, that a requested network access technology of the mobile computing device is an impermissible network access technology for the mobile computing device in the location;
  generating, by the SIM and based at least in part on determining that the requested network access technology is the impermissible network access technology for the mobile computing device in the location, an error notification configured to prohibit the mobile computing device from connecting to the network via the requested network access technology;
  sending, from the SIM to another component of the mobile computing device, the error notification, the error notification including an indication of at least one alternate network access technology; and
  causing the mobile computing device to connect to the network via an alternate network access technology of the at least one alternate network access technology.

10. The one or more non-transitory computer-readable media as claim 9 recites, wherein the event comprises at least one of a boot up of the mobile computing device, a lapse of a preconfigured period of time associated with a polling cycle, or a change to the location of the mobile computing device.

11. The one or more non-transitory computer-readable media as claim 9 recites, wherein the location information comprises at least one of a mobile country code, a mobile network code, a cell identifier, or a location area code.

12. The one or more non-transitory computer-readable media as claim 9 recites, the operations further comprising accessing the location information responsive to detecting the event.

13. The one or more non-transitory computer-readable media as claim 9 recites, the operations further comprising:
  accessing the location information responsive to receiving a request from the SIM; and
  providing the location information to the SIM, wherein the SIM utilizes the location information to determine that the requested network access technology is an impermissible network access technology.

14. The one or more non-transitory computer-readable media as claim 9 recites, the operations further comprising:
  receiving, by the SIM, a request associated with a different network access technology than the requested network access technology;
  determining, based at least in part on the network access technology data and the location information, whether the different network access technology is a permissible network access technology for the mobile computing device in the location; and
  based at least in part on determining that the different network access technology is the permissible network access technology for the mobile computing device in the location, sending, from the SIM to the network, a request to access the network via the different network access technology.

15. The one or more non-transitory computer-readable media as claim 9 recites, wherein the configuration table is configurable based at least in part on a price plan or a level of service available to an account of a subscriber of the mobile computing device.

16. The one or more non-transitory computer-readable media as claim 9, the operations further comprising receiving, from one or more server computing devices associated with the network, an instruction to update the configuration table, wherein the instruction is received (i) in near-real time and (ii) responsive to a change in at least one of network traffic or a quality of service associated with the network.

17. A mobile computing device comprising:
  one or more processors; and
  one or more computer-readable media storing instructions that, when executed by the one or more processors, cause the one or more processors to perform operations comprising:
    detecting an event associated with the mobile computing device;
    accessing location information associated with a location of the mobile computing device;
    accessing a configuration table stored in association with a subscriber identity module (SIM) of the mobile computing device, wherein the configuration table indicates permissible network access technologies for the mobile computing device to utilize at each of one or more locations;
    determining, based at least in part on the configuration table, on network access technology data provided by a network, and on the location information, that a requested network access technology of the mobile computing device is an impermissible network access technology for the mobile computing device in the location;
    generating, by the SIM and based at least in part on determining that the requested network access technology is the impermissible network access technology for the mobile computing device in the location, an error notification configured to prohibit the mobile computing device from connecting to the network via the requested network access technology;
    sending, from the SIM to another component of the mobile computing device, the error notification, there error notification including an indication of at least one alternate network access technology; and
    causing the mobile computing device to connect to the network via an alternate network access technology of the at least one alternate network access technology.

18. The mobile computing device as claim 17 recites, wherein the SIM determines that the requested network access technology is not a permissible network access technology for the mobile computing device in the location, and causing the mobile computing device to connect to the network via the alternate network access technology comprises sending, from the SIM to another component of the mobile computing device, the error notification to prohibit the mobile computing device from connecting to the network via the requested network access technology.

19. The mobile computing device as claim 17 recites, the operations further comprising:
- receiving, by the SIM, a request associated with a different network access technology than the requested network access technology;
- determining, based at least in part on the network access technology data and the location information, that the different network access technology is a permissible network access technology for the mobile computing device in the location; and
- based at least in part on determining that the different network access technology is the permissible network access technology for the mobile computing device in the location, sending, from the SIM to the network, a request to access the network via the different network access technology.

20. The mobile computing device as claim 19 recites, the operations further comprising:
- determining, based at least in part on the network access technology data and the location information, a service available to the mobile computing device in the location via the different network access technology; and
- causing the mobile computing device to access the service via the different network access technology.

\* \* \* \* \*